Feb. 19, 1935. A. C. PETERSON 1,991,518
AUTOMOTIVE POWER ACTUATED TRANSMISSION MEANS
Original Filed May 17, 1927 2 Sheets-Sheet 2

Inventor
Adolph C. Peterson

Patented Feb. 19, 1935

1,991,518

UNITED STATES PATENT OFFICE 1,991,518

AUTOMOTIVE POWER ACTUATED TRANSMISSION MEANS

Adolphe C. Peterson, Minneapolis, Minn.

Application May 17, 1927, Serial No. 192,140
Renewed July 11, 1934

15 Claims. (Cl. 74—59)

My invention relates to transmission means and particularly to a transmission means which is adapted to automotive vehicles and which is power actuated and which therewith is called automotive power actuated transmission means.

The principal objects of my invention are to provide a variable transmission means which shall be simple in construction, simple in operation or control and durable in use and which shall have certain advantages in the use thereof. The invention has particularly in its use a more efficient and speedy change from one transmission to another, is operable without any difficult and complicated movements by the operator, is simple in its method of changing gears, is positive and quick in its change from one gear set to another, is quickly restorable to its lower gear ratio, and in particular is a simple and efficient method of using the engines power in accomplishing the change from one gear set to another. In general the device is an improved automotive vehicle transmission adaptable for motor cars, busses, trucks and rail cars particularly.

The principal devices and combinations of devices comprising my invention are as hereinafter described and as defined in the claims. In the accompanying drawings which illustrate my invention like characters refer to like parts throughout the several views.

Referring to the drawings:

Figure 3 is a cross section on the line III—III of Figure 1 looking from right of Figure 1.

Figure 4 is a view of the so-called locking unit looking from the right of Figure 1, this being a detail view.

Figure 5 is a view in cross section on the line V—V of Figure 1 looking from right of Figure 1.

Figure 1:
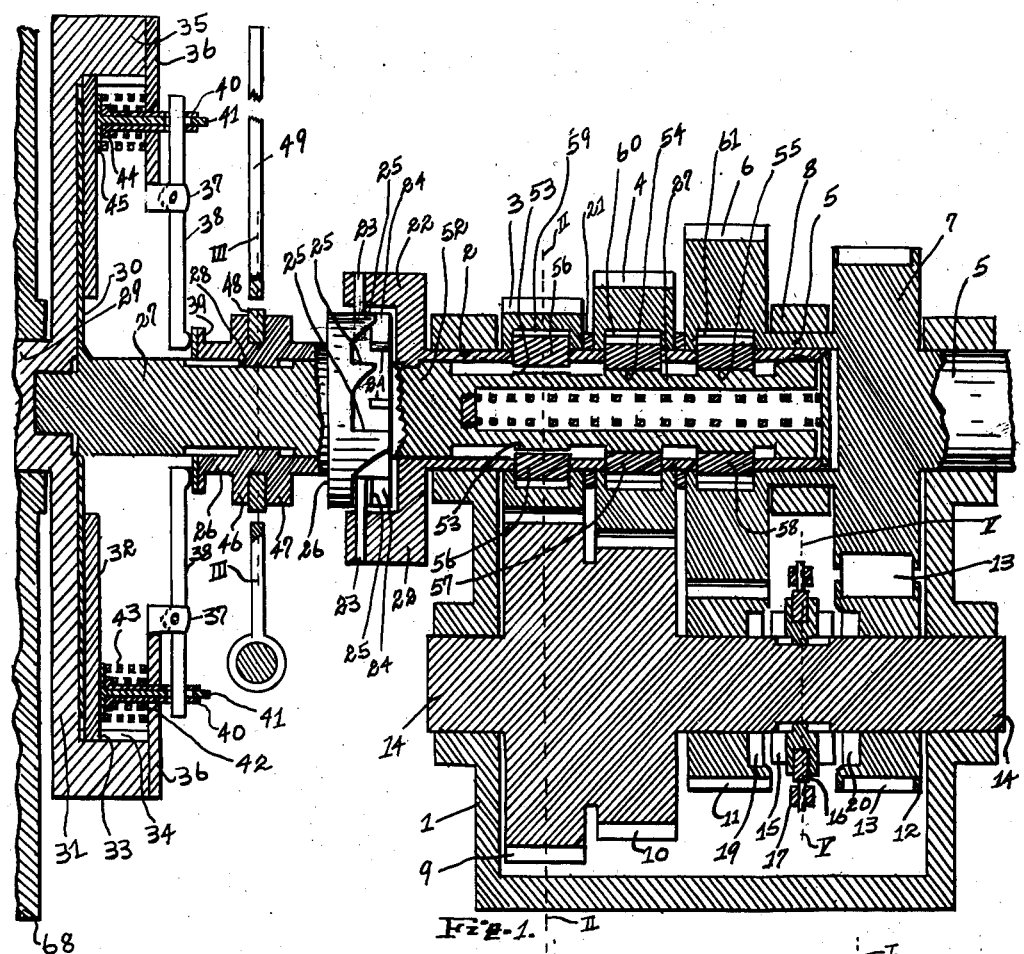
Figure 1 is a view chiefly in vertical section on a plane passing through the axis of the transmission shafts and gears of a transmission embodying my device, some parts being shown in full side elevation, this section being on the line I—I of the other views where applicable.
Figure 2:
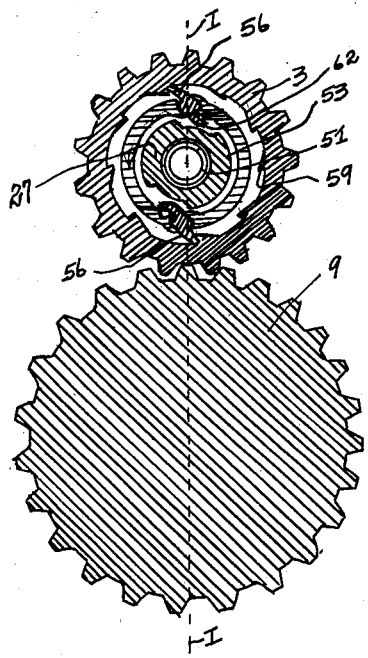
Figure 2 is a cross section on the line II—II of Figure 1 looking from left of Figure 1.

Referring again to the drawings, the numeral 1 indicates a transmission gear box constructed of iron or any metal preferably, and of the usual form or approximately so. The gear box 1 has bearings formed integrally with it as shown wherein the other parts hereinafter described are revolvably mounted. In the upper portion of the gear box 1 there is mounted a so-called primary shaft 2 which is in the greater portion of its length in the form of a tube as shown. The primary shaft 2 has rotatably mounted upon it, that is freely mounted upon it, a low gear 3, which is a spur gear, and a middle or intermediate gear, also a spur gear, 4. The primary shaft 2 at its rear end passes into and rotates in a propeller shaft 5 as a bearing. The propeller shaft 5 has securely fixed to it a spur gear 6 and a sprocket wheel 7, there being a bearing 8 between the latter two, the bearing being fixed or secured in the gear box 1.

The low gear 3 is in constant mesh with a larger spur gear 9, and the intermediate gear 4 also is in constant mesh with a spur gear 10, and the spur gear 6 is in constant mesh with a spur gear 11, and the sprocket wheel 7 is in constant train with a sprocket wheel 12 by means of a sprocket chain 13. The spur gears 9 and 10 are preferably constructed integrally with a shaft 14 whereby the shaft 14 and its said two spur gears constitute a secondary shaft revolvably mounted in bearings in the gear box 1 below the primary shaft as shown. The sprocket wheel 12 and the spur gear 11 are each of them freely, that is rotatably, mounted on the shaft 14 but they may be either of them separately clutched with the shaft 14 by means of a double dog-clutch 15 the latter being slidable axially upon the shaft 14 by means of a collar 16 and lever 17 and being fixed rotatably with the shaft 14 by means of a lug or key 18 slidable in a key-way in the shaft 14. The double dog-clutch 15 may engage in one extreme portion of its movement a dog-clutch 19 in spur gear 11 and in the other extreme end of its movement may engage a dog clutch 20 in the sprocket wheel 12. Thus the shaft 14 may be engaged by either the spur gear 11 or the sprocket wheel 12 with the propeller shaft 5 but not by both in unison or if the double dog clutch 15 is in the intermediate position, these connections are in neutral.

The spur gears on the primary shaft 2 are separated by collars 21 so that they keep their proper position. The primary shaft 2 at its front end has integrally formed with it or secured firmly to it a flange or wheel-like structure 22 which bears fixed in it at diametrically opposite points two inwardly pointing or depending pins 23, so called resisting units or deterents, each of which must be relatively strong so that they take the driving load. These pins 23 are adapted to be engaged by the so-called bars 24 and the so-called dog faces 25 of a locking unit 26. There is one set of bars and dog faces for each pin 23, and the arrangement is such that each dog face with a related dog face diametrically opposite constitutes one step in rotational engagement with the pins 23, as hereinafter described. The locking unit 26 is located slidable axially upon a so-called clutch and cam shaft 27, a key 28 providing means whereby the locking unit 26 is rotationally engaged fixedly with the clutch and cam shaft 27.

The clutch and cam shaft 27 at its rear end passes axially through the primary shaft 2 and is mounted in the latter as a bearing, as shown. At its forward end the clutch and cam shaft 27 is rotatably mounted in the rear end of an engine crank shaft 29 as a bearing and bears approximately at that end a thin plate clutch 30 which is stationed and engaged between a flywheel 31 on the forward side and on its rear side a plate 32. The plate 32 has a geared or serrated edge 33 by means of which it is constantly engaged with a similar or counterpart gear face 34 in the inner side of the flywheel rim 35, in such manner that the plate 32 may be moved axially of the flywheel to engage the clutch plate 30 between it and the flywheel 31. The flywheel rim bears radially inwardly extending a washer or ring plate 36 which has bearings 37 in which clutch levers 38 are fulcrumed in such way that the inner ends of the clutch levers 38 are engaged on the rear side by the flange 39, the latter being formed integrally with the locking unit 26. The outer ends of the clutch levers 38 extend into related pairs of coil spring lifters, these pairs, being each related to one clutch lever 38 and being each comprised of an inner lifter 40 and an outer lifter 41. The inner lifter 40 is adapted to lift an inner coil spring 42 against or to compress it against the washer plate 36 and the outer lifter 41 is adapted to lift or compress an outer coil spring 43 against the washer plate 36. The outer ends of the clutch levers extend as shown through slots in the ends of the lifters and the relation and length of the slots is such in each pair that the ends of the clutch levers in a declutching movement first engage the inner coil spring lifter and thereafter, after the related spring has been lifted from engagement, engages the outer coil spring lifter. This relation is the same in all the pairs, and the relation between the pairs is such that all the inner coil spring lifters are simultaneously engaged and that thereafter as a succeeding step or movement all the outer coil spring lifters are engaged, and so that thus in the declutching movement of the locking unit, which is a forward movement thereof, first all the inner coil springs 42 are disengaged and as a succeeding step all the outer coil springs 43 are disengaged or compressed from engagement or pressure on the plate 32. The lifters on their forward ends have heads 44 and 45, respectively, as shown. The relative movement is such therefore that the plate may first be relieved from the pressure of the inner coil springs 42 and thereafter as a succeeding step in the release may be relieved from the pressure of the outer coil springs 43. Thus the clutch plate 30 may be subjected to a heavy or complete engagement pressure and may be subjected to a lighter or slippage engagement. The latter engagement must be just sufficient so that it will at all times procure just enough transmission of torque from the engine crank shaft to the clutch and cam shaft 27 to effect the gear engagement transition as hereinafter described. The complete engagement must be sufficient so that the full torque of the engine crank shaft may be transmitted without slippage.

The locking unit 26 has collars 46, 47 formed integrally, between which a disengagement collar 48 is mounted, the latter being movable by a pedal lever 49 engaging therewith by pins 50. The parts have such relative movement that when the clutch levers have been moved sufficiently so that the inner coil springs 42 are lifted and that there is therefore the slippage condition of the clutch plate 30, the locking unit with its dog faces 25 and bars 24 have been moved forwardly so that the dog faces 25 have been moved forward out of the transverse plane of the pins 23 and so that the latter are in the plane of the bars 24, and so that when the inner and outer coil springs, 42 and 43 have been all lifted, and the clutch plate 30 is completely disengaged, that both the dog faces 25 and the bars 24 have been moved forward out of the plane of the pins 23 and so that therefore in this condition the pins 23 are freed from both the bars 24 and dog faces 25 and the primary shaft freed therefore from this engagement may rotate forwardly that is, in the clockwise direction looking from the right of Figure 1 relative to the clutch and cam shaft 27 under the urge or impelling effect of a coil spring 51 to its initial or so-called starting position. Or conversely stated, when the clutch plate 30 is completely disengaged, the clutch and cam shaft 27 will be freed to rotate relatively to the primary shaft 2 in the anti-clockwise direction looking from the right of Figure 1. A key 52 in the primary shaft has such relation to a circumferential key-way in the clutch and cam shaft 27, circumferentially, that the key 52 permits the primary shaft to have the exact forward, that is, clockwise, rotational movement relative to the clutch and cam shaft so as to permit the former to rotate or progress forwardly exactly to its proper starting point. The coil spring 51 is as shown placed axially in a bore in the rear end of the clutch and cam shaft 27 and at its forward end is fixed in the clutch and cam shaft as shown and at its rear end is fixed in the rear end of the primary shaft and has such relative tension or effect that when the clutch and cam shaft is under the engine torque through partial engagement of the clutch plate 30, rotated forwardly that is, in the clockwise direction looking from the right of Figure 1 relative to the primary shaft the coil spring tension will be increased and so that under complete disengagement of clutch plate 30 when the locking unit releases the primary shaft the latter will be impelled forwardly relative to the clutch and cam shaft, the movement then being limited however by the key 52.

The clutch and cam shaft has one cam face 53 related to the spur gear 3, another cam face 54 related to the intermediate gear 4 and another 55 related to the spur gear 6, each cam face being so located that it is in the same rotational plane as the spur gear. The primary shaft 2 has fulcrumed in it in its sides pairs of driving lugs, each pair being related to one spur gear 3, 4, or 6 and each pair being in the plane of one cam face, 53, 54, or 55. These pairs of driving lugs, one pair designated as 56, one as 57, and one as 58, are so fulcrumed in the side wall of the primary shaft tube 2 that the lugs of any pair may be radially outwardly raised to engage a related ratchet gear face 59, 60, 61 respectively in the related gears 3, 4, or 6. These pairs of driving lugs have on their ends interiorly of the primary shaft cam engaging knobs, those related to pair 56 being designated as 62, which are adapted to engage their related cam faces. These pairs of driving lugs have related pairs of small leaf springs, those related to pair 56 being designated as 65, which respectively tend to elevate their related driving lug into engagement with its or their related ratchet gear faces 59, 60, 61. The cam faces are so related to the knobs that the cam faces in all positions of the clutch and cam shaft, rotational, relative to the primary shaft, engage the knobs and therefore keep the related driving lugs depressed, that is disengaged, except when the clutch and cam shaft 27 is in the position as fixed by locking unit 26 which corresponds to the predetermined position for engagement of the respective gear 3, 4, or 6. The engine crank shaft is related and driven by an engine 68 which latter is illustrated by its extreme rear end.

In the use of my device, the engine crank shaft is driven as usual in automotive vehicles by the engine 68 and the propeller shaft is adapted to drive the wheels of an automotive vehicle or any device required to be driven and where flexibility in the driving torque is a requisite. In the neutral position of my transmission the dog clutch 15 is disengaged from either the spur gear 11 or sprocket wheel 12 and the locking unit 26 is in such position that the dog faces 25 are rotated rearwardly that is, in the anti-clockwise direction looking from right of Figure 1 relative to primary shaft 2 whereby the driving lugs related to low gear 3 are elevated and the other driving lugs depressed. Thereby the engine crank shaft may convey no power driving effect to propeller shaft 5. If now it is desired to procure driving of the propeller shaft 5, the operator first, for forward driving moves dog clutch 15 to engage with spur gear 11 whereby the shaft 14 becomes engaged with the spur gear 6 and thus with shaft 5. The operator has however, prior to this depressed the pedal lever 49 to fully disengage the clutch plate 30 that is so that both the inner and outer coil springs are lifted from engagement or pressure. The primary shaft 2 is thus in this preliminary released condition of clutch plate 30 free to move forwardly that is, in the clockwise direction looking from right of Figure 1 relative to clutch and cam shaft and when dog clutch 15 is engaged with spur gear 11 the engine clutch 30 is disengaged. The operator may now permit clutch 30 to be fully engaged by releasing pedal lever 49 and by this movement drive through spur gear 3, spur gear 9, spur gear 11 and spur gear 6 is effected. The operator may permit this to continue until some speed is attained or as long as he desires or he may immediately after the first full engagement of clutch 30 (by which the first bar 24 is passed and the first dog face 25 reached by pins 23) again partially depress the pedal lever 49 so that the inner coil springs 42 are disengaged and by this movement he has caused pins 23 to be released from the first dog face to the second pair of bars 24 and may then permit lever 49 to fully elevate again whereby pins 23 are permitted to pass from second pair of bars 24 to second pair of dog faces 25, and in this position the driving lugs related to spur gear 4 are elevated and the driving lugs related to spur gear 3 depressed. He may permit this condition to continue or he may immediately again partially depress the pedal lever 49 so that inner coil springs 42 are again lifted and by this partial disengagement movement the pins 23 are permitted to pass from second dog faces 25 to third bars 24 and if then pedal lever 49 is again fully elevated for full engagement, the pins 23 are then permitted to pass from third bars 24 to third dog faces 25 and in this last or final and direct engagement position, the driving lugs are all depressed except that the pair related to the spur gear 6 are elevated and thereby the primary shaft 2 is directly engaged to the spur gear 6 and thus to the propeller shaft 5. This progression of the transmission engagement from the low speed engagement to the next, and subsequently, as desired and effected by the operator's control, to the direct engagement, is induced through the operation of the engine torque under partial engagement of the clutch 30, whereby under the changing movement, the clutch and cam shaft 27 moves in the clockwise direction looking from right of Figure 1 against tension of spring 51 successively in each step of the transition until the movement is barred by the engagement between locking unit 26 and primary shaft 2 through the faces of locking unit 26 and pins 23. In all of these passing or transition movements the pedal lever 49 is never fully disengaged but the operator very readily feels the point where the full disengagement of the outer coil springs is about to commence and he can therefore very properly and easily gage the pedal movements correctly. In these transition movements, the partial engagement of the clutch plate 30 by light outer coil springs 43 is sufficient to cause enough torque upon the clutch and cam shaft 27 so that the latter is tended to be forwardly rotated that is, in the clockwise direction looking from right of Figure 1 relative to the primary shaft and therefore the cam faces are caused to pass into their next forwardly progressive position relatively, and by the same progressive movement the coil spring 51 is given further tension. In these transition movements the driving lugs which are at any time engaged are always permitted free engagement but may override or overrun their related ratchet gear until the clutch and cam shaft has moved forwardly so that the next succeeding driving lugs have become elevated and engaged, but the cam faces are such that immediately the succeeding driving lugs have become engaged in the so-called upward movement, the lower driving lugs become depressed and therefore positively disengaged. The springs related to the driving lugs procure this effect. If now the operator may again desire a lower gear engagement he completely disengages the clutch 30 whereupon the locking unit 26 with the clutch and cam shaft 27 is permitted full rearward movement relatively to clutch and cam shaft 27 and therefore the pins 23 are brought back to position where they engage the first bars 24 and thereupon first dog faces upon reengagement of the clutch 30. Thus any position of engagement for forward driving is procured by merely depressing the pedal lever 49 partially or fully. For reverse driving the operator fully declutches lever 49 and then moves dog clutch 15 to disengage gear 11 and engage sprocket wheel 12 and then permits the lever 49 to elevate engaging the clutch 30 but is careful not to permit engagement of a higher gear than gear 3. The method shown is for the sake of simplicity in the drawings.

In any of the transition movements since the lower gear drive is first engaged and then a higher or direct drive engaged the spur gear 3 or 4 which is lower will, as soon as the higher gear is engaged, rotate faster than the primary shaft 2, and thereby the lower gear which is so superseded will overrun on the driving lugs related to it until the driving lugs related have become depressed by the further forward rotational movement of the clutch and cam shaft 27. The cam face must procure this relation whereby always in passing upwardly one of the drives will be engaged so that there will therefore always be some tension between the propeller shaft 5, and the clutch and cam shaft, that is whenever either the clutch 30 is fully engaged or partially engaged. But whenever the clutch 30 is full disengaged, that is when both inner and outer coil springs are elevated or brought out of contact with the clutch plates the coil spring 51 is then strong enough to procure forward rotational movement of the primary shaft or conversely rearward rotation of the clutch and cam shaft relative to the primary shaft 2. If the operator desires to continue driving in low gear but to declutch clutch 30 fully he may fully disengage clutch 30 and by so doing the effect of the coil spring 51 is to keep the primary shaft 2 in the position for low speed reengagement when the clutch 30 is again fully engaged. He may at any time progress to a higher or direct drive by partially depressing the clutch pedal either once or twice quickly after having once fully depressed the clutch pedal. If he fully disengages from direct drive, he may reengage direct drive by two quick partial disengagements. Clutch and cam shaft preferably would be in two parts rotating together.

Figure 7:
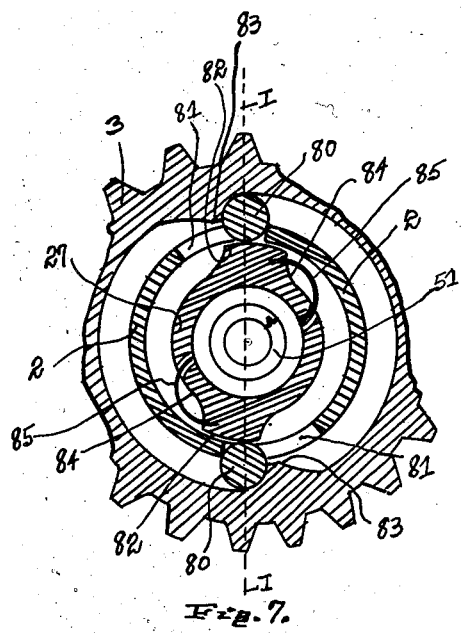
Figure 7 is a detail cross sectional view looking from the left of Figure 1, showing a modified form of engagement means.
Figure 6:
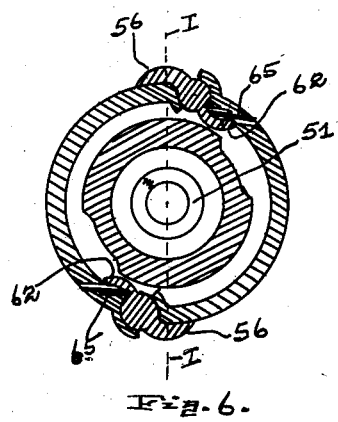
Figure 6 is an enlarged detail view of the parts 56, 62, and 65 particularly this being a partial section on the line II—II of Figure 1, looking from left of Figure 1.

Referring now to the modified form of my device shown in Figure 7, only as a detail view of the spur gear driving engagement means, this form would be in general similar to the first form described but the modified form of engagement between the primary shaft 2 and the spur gear 3, 4, or direct drive is used. In this modified form of engagement, instead of driving lugs as used in the first form, there are employed instead rollers 80 which may be say about one or two inches long, and about say one quarter or one half inch in diameter or more depending on the thickness of the spur gears and their diameter and the power to be transmitted. These rollers 80 of which there are a plurality in each spur gear, or related thereto, roll in slots 81 in the primary shaft 2, all related to one spur gear in the same plane, and they are normally depressed inwardly by the overrunning of a related spur gear 3 or 4, etc., but they may be elevated by the clutch and cam shaft 27 which latter in this case has a face portion 82 in each engagement plane which is adapted to force the related roller outwardly into engagement with the ratchet tooth 83 of the related spur gear 3. The rearward side of the cam face 82 has an inclined part 84 to which a flat leaf spring is attached and the latter spring 85 is adapted to yieldably force the related roller outwardly during the overrunning period, that is when the next succeeding drive is being positively engaged.

While I have shown particular detailed devices and combinations of devices in the illustration of my device I contemplate that other detailed devices and combinations of devices may be used in the realization of my device, particularly that different control means may be used and that other individual driving lugs or forms thereof may be used and that particularly that the roller form of ratchet drive together with my cam expanding means successively engaging series of rollers may be used.

What I claim is:

1. In a transmission means, a main driving member, a main driven member, transmission sets each having an engageable member adaptable to be engaged between the driving and driven member, a primary shaft axially located in an engageable member of each transmission set, engaging elements related one to each engageable member, a cam member carried rotationally by one of the main members and having a face contour adapted for engaging actuation of the engaging elements in progressive rotary movement relative to the primary shaft, a yieldable spring engaged rotationally between the cam member and primary shaft for progressive tension accumulation, and a progressive step-movement control means between the cam member and the primary shaft whereby the cam member may be permitted a limited stepped relative movement for control of the engagement.

2. In a transmission means, a main driving member, a main driven member, gear sets each having an engageable member adaptable to be engaged between the driving and the driven members, a primary shaft axially located in an engageable member of each gear set, radially extensible engaging elements related one to each engageable member and having each coordinated radially retractible cam follower faces, a cam member carried rotationally by one of the main driving and driven members and having a face contour adapted for movement of the engaging elements by contact with the cam follower faces in progressive order by relative rotary movement of the primary shaft and cam member, a control means comprising resisting units on one of the primary shaft and cam members and locking means axially reciprocable of the other member procuring interaction of the resisting units and the locking means to permit limited progressive relative rotational movement between the primary shaft and cam member.

3. In a transmission means, a main driving member, a main driven member, gear sets each having an engageable member, adaptable to be engaged between the driving and driven members, a primary shaft axially located in an engageable member of each gear set, radially extensible engaging elements related one to each engageable member and having each coordinated radially retractible cam follower faces, a cam member carried rotationally by one of the main driving and driven members, and having a face contour adapted for movement of the engaging elements by contact with the cam follower faces in progressive order by relative rotary movement of the primary shaft and cam member, a control means comprising resisting units on one of the primary shaft and cam members and locking means axially reciprocable of the other member procuring interaction of the resisting units and the locking means to permit limited progressive relative rotational movement between the primary shaft and cam member and a manual means for imparting the axially reciprocable movement.

4. In a transmission means, a main driving member and a main driven member, gear sets each having an engageable member adaptable to be engaged between the driving and driven members, an engine shaft and a main clutch between the engine shaft and main driving member, a primary shaft axially located in an engageable member of each gear set, radially extensible engaging elements related one to each engageable member and having each coordinated radially retractible cam follower faces, a cam member carried rotationally by one of the main driving and driven members and having a face contour adapted for movement of the engaging elements by contact with the cam follower faces in progressive order by relative rotary movement of the primary shaft and cam member, a control means comprising resisting units on one of the primary shaft and cam members and locking means axially reciprocable of the other member procuring interaction of the resisting units and the locking means to permit limited progressive relative rotational movement between the primary shaft and cam member and connecting linkage between the main clutch actuating lever and the locking means for imparting the axially reciprocable movement to the locking means on partial disengagement of the main clutch.

5. In a transmission means, a main driving member, a main driven member, gear sets each having an engageable member adaptable to be engaged between the driving and driven members, a primary shaft axially located in an engageable member of each gear set, engaging elements related one to each engageable member and having each related cam follower faces, a cam member carried rotationally by one of the main members and having a face contour adapted for movement of the engaging elements by contact with the cam follower faces in progressive order by relative rotary movement of the primary shaft and cam member, a control means comprising resisting units on one of the primary shaft and cam members and locking means axially reciprocable of the other member procuring interaction of the resisting units and the locking means to permit limited progressive relative rotational movement between the primary shaft and cam member and a yieldable element for compression by the relative rotational movement and for retrogressive movement relatively of the primary shaft and cam member on extreme movement of the locking means for relative release of the members.

6. In a transmission means, a main driving member and a main driven member, gear sets each having an engageable member adaptable to be engaged between the driving and driven members, a primary shaft axially located in an engageable member of each gear set, radially extensible engaging elements related one to each engageable member and having each coordinated radially retractible cam follower faces, a cam member carried rotationally by one of the main members and having a face contour adapted for movement of the engaging elements by contact with the cam follower faces in progressive order by relative rotary movement of the primary shaft and cam member, and a control means comprising resisting units transversely of one of the primary shaft and cam members and locking means having blocking surfaces in two planes transversely thereof and axially reciprocable of the other member to place the resisting units alternately in the two planes procuring interaction of the resisting units and the locking means to permit limited progressive relative rotational movement between the primary shaft and cam member.

7. In a transmission means, a main driving member, a main driven member, transmission sets each having an engageable member adaptable to be engaged between the driving and driven member, a primary shaft axially located in an engageable member of each transmission set, engaging elements related one to each engageable member, a cam member carried rotationally by one of the main members and having a face contour adapted for engaging actuation of the engaging elements in progressive rotary movement relative to the primary shaft, a yielding spring engaged rotationally between the cam member and primary shaft for progressive tension accumulation, a control means comprising rotation resisting means on the primary shaft and rotation resisting means on the cam member and means whereby one of the rotation resisting means is axially reciprocable of the other rotation resisting means to permit limited progressive relative rotational movement between the primary shaft and the cam member.

8. In a transmission means, a main driving member, a main driven member, transmission sets each having an engageable member adaptable to be engaged between the driving and driven members, a primary shaft axially located in an engageable member of each transmission set, engaging elements related one to each engageable member, a cam member carried rotationally by one of the main members and having a face contour adapted for engaging actuation of the engaging elements in progressive rotary movement relative to the primary shaft, a yieldable spring engaged rotationally between the cam member and primary shaft for progressive tension accumulation, a control means comprising rotation resisting means on the primary shaft and rotation resisting means on the cam member one of the rotation resisting means being axially reciprocable of the other to permit limited progressive relative rotational movement between the primary shaft and the cam member and a means for imparting the axially reciprocable movement to the reciprocable rotation resisting means.

9. In a transmission means, a main driving member, a main driven member, transmission sets each having an engageable member adaptable to be engaged between the driving and driven members, a primary shaft axially located in an engageable member of each transmission set, engaging elements related one to each engageable member and having each a related cam follower face, a cam member carried rotationally by one of the main members and having face contour adapted for engaging actuation of the engaging elements by contact with the cam follwer faces in progressive order by relative rotary movement of the primary shaft and cam member, a yieldable spring engaged rotationally between the cam member and primary shaft for progressive tension accumulation, a control means comprising rotation resisting means on the cam member and rotation resisting means on the primary shaft and means whereby one of the rotation resisting means is axially reciprocable of the other rotation resisting means to permit limited progressive relative rotational movement between the primary shaft and the cam member.

10. In a transmission means, a main driving member, a main driven member, transmission sets each having an engageable member adaptable to be engaged between the driving and driven member, a primary shaft axially located in an engageable member of each transmission set, engaging elements related one to each engageable member and having each a related cam follower face, a cam member carried rotationally by one of the main driving and driven members and having a face contour adapted for engaging actuation of the engaging elements by contact with the cam follower faces in progressive order by relative rotary movement of the primary shaft and the cam member, a yieldable spring engaged rotationally between the cam member and primary shaft for progressive tension accumulation, a control means comprising rotation resisting means on the primary shaft and rotation resisting means on the cam member one of the rotation resisting means being axially reciprocable of the other rotation resisting means to permit limited progressive relative rotational movement between the primary shaft and the cam member and a means for imparting the axially reciprocable movement to the reciprocable rotation resisting means.

11. In a transmission means, a main driving member, a main driven member, transmission sets each having an engageable member adaptable to be engaged between the driving and driven members, a primary shaft axially located in an engageable member of each transmission set, engaging elements related one to each engageable member and having each a related cam follower face, a cam member carried rotationally by one of the main driving and driven members and having a face contour adapted for engaging actuation of the engaging elements by contact with the cam follower faces in progressive order by relative rotary movement of the primary shaft and cam member, a control means comprising rotation resisting means on the primary shaft and rotation resisting means on the cam member one of the rotation resisting means being axially reciprocable of the other rotation resisting means to permit limited progressive relative rotational movement between the primary shaft and the cam member and a yieldable element engaged rotationally between the cam member and primary shaft opposing the progressive relative rotational movement and inducing retrogressive movement of the cam member relatively to the primary shaft on subsidence of driving torque on the main driving member.

12. In a transmission means, a main driving member, a main driven member, transmission sets each having an engageable member adaptable to be engaged between the driving and driven members, a primary shaft axially located in an engageable member of each transmission set, engaging elements related one to each engageable member and having each a related cam follower face, a cam member carried rotationally by one of the main driving and driven members and having a face contour adapted for engaging actuation of the engaging elements by contact with the cam follower faces in progressive order by relative rotary movement of the primary shaft and the cam member, a yieldable spring engaged rotationally between the cam member and primary shaft for progressive tension accumulation, a control means comprising resisting means having resisting elements in two planes transversely of the rotational axis and a complementary resisting means, one of the resisting means being carried rotationally by the primary shaft and the other by the cam member, and one of the resisting means being axially reciprocable and cooperable with the other resisting means procuring interaction between the resisting elements and complementary resisting means to permit limited progressive relative rotational movement between the primary shaft and the cam member.

13. In a transmission means, a main driving member, a main driven member, transmission sets each having an engageable member adaptable to be engaged between the driving and driven members, a primary shaft located in an engageable member of each transmission set, engaging elements related one to each engageable member each oscillatable with a cam follower and a cam member carried rotationally by one of the main driving and driven members and having a face contour adapted for engaging actuation of the engaging elements by contact with the cam followers in progressive order by relative rotary movement of the primary shaft and the cam member, a yieldable spring engaged rotationally between the cam member and primary shaft for progressive tension accumulation, a control means comprising rotation resisting means on the cam member and rotation resisting means on the primary shaft, one of the rotation resisting means being axially reciprocable of the other rotation resisting means to permit limited progressive relative rotational movement between the primary shaft and the cam member and a means for imparting the axially reciprocable movement to the reciprocable rotation resisting means.

14. In a transmission means, a main driving member, a main driven member, transmission sets each having an engageable member adaptable to be engaged between the driving and driven members, a primary shaft axially located in an engageable member of each transmission set, engaging elements related one to each engageable member and carried by related cam followers, a cam member carried rotationally by one of the main driving and driven members and having a face contour adapted for engaging actuation of the engaging elements by contact with the cam followers in progressive order by relative rotary movement of the primary shaft and the cam member, a control means comprising rotation resisting means on the cam member and rotation resisting means on the primary shaft, one of the rotation resisting means being axially reciprocable of the other rotation resisting means to permit limited progressive relative rotational movement between the primary shaft and the cam member and a means for imparting the axially reciprocable movement to the reciprocable rotation resisting means, and a yieldable element engaged rotationally between the cam member and primary shaft opposing the progressive relative rotational movement and inducing retrogressive movement of the cam member relatively to the primary shaft on subsidence of driving torque on the main driving member.

15. In a transmission means, a main driving member, a main driven member, gear sets each having an engageable member adaptable to be engaged between the driving and the driven member, a primary shaft axially located in an engageable member of each gear set, radially extensible engaging elements related one to each engageable member and having each coordinated radially retractible cam follower faces, a cam member carried rotationally by one of the main driving and driven members and having a face contour adapted for movement of the engaging elements by contact with the cam follower faces in progressive order by relative rotary movement of the primary shaft and cam member, a progressive step-movement control means between the cam member and the primary shaft whereby the cam member may be permitted a limited stepped relative movement for control of the engagement.

ADOLPHE C. PETERSON.